Aug. 21, 1923.

A. M. CURTIS 1,465,757

ELECTRICAL WAVE FILTER

Original Filed Oct. 8, 1917

Inventor:
Austen M. Curtis
by J.G. Roberts
Atty.

Patented Aug. 21, 1923.

1,465,757

UNITED STATES PATENT OFFICE.

AUSTEN M. CURTIS, OF EAST ORANGE, NEW JERSEY, ASSIGNOR TO WESTERN ELECTRIC COMPANY, INCORPORATED, OF NEW YORK, N. Y., A CORPORATION OF NEW YORK.

ELECTRICAL-WAVE FILTER.

Original application filed October 8, 1917, Serial No. 195,371. Patent No. 1,371,228, dated March 15, 1921. Divided and this application filed August 7, 1919. Serial No. 315,842.

*To all whom it may concern:*

Be it known that I, AUSTEN M. CURTIS, a citizen of the United States, residing at East Orange, in the county of Essex, State of New Jersey, have invented certain new and useful Improvements in Electrical-Wave Filters, of which the following is a full, clear, concise, and exact description.

This invention relates to a novel form of electrical wave filter which may be used in wireless systems.

An object of this invention is the provision of a filter for the selective transmismission of electrical impulses of certain characteristics to the exclusion of impulses of different character and which may be used in wireless systems efficiently for the elimination of the effects of static and atmospheric disturbances in the signaling system when signals are being received.

Another object of the invention is the provision of a wave filter which is substantially free from capacitative reactance.

This application is a division of the A. M. Curtis application Serial No. 195,371, filed October 8, 1917, Reduction of static interference in radio receiving stations on which Patent #1,371,228 issued March 15, 1921.

Figure 2:
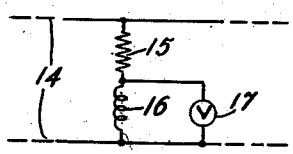

The invention makes use of a wave filter of the general form shown in Fig. 2 of the application filed by E. O. Scriven, July 14, 1917, Serial No. 180,589, entitled Oscillation generators, on which this is an improvement. This Scriven application discloses a wave filter for efficiently transmitting low frequencies and suppressing high frequencies. This type of filter has been termed an ultrafilter. The present invention takes advantage of the fact that the filter in Fig. 2 of the Scriven application is composed only of resistance and one form of reactance and is substantially free from any other sort of reactance, giving rise to the fact that the period of natural oscillations of the filter is very high in comparison to the frequencies it efficiently transmits.

The present invention improves on the type of filter which is described by providing unidirectional elements, such as vacuum tubes, between adjacent filter sections so as to prevent reaction between the filter sections. The present invention also provides a filter of the above type in which there are contained only resistance and inductance arranged in various ways. It also provides a filter similar to the one described in the Scriven case but of the infra type, that is, i. e., one suppressing relatively low frequencies, this type also having the advantage of a very high natural period by reason of the fact that it is composed only of resistance and inductance elements, being substantially free from capacity reactance.

The present invention also provides infra and ultra-filters in combination, which have a high natural period, and which are composed of inductance and resistance elements and are substantially free from capacity reactance. In this latter form, the filter is called a band filter in that it suppresses a band of frequencies, the value of which lies between definite limits.

A band filter made in accordance with the present invention and having a very high period of natural oscillations, is of advantage when used in a radio receiving system, as the energy of static impulse on striking the filter produces natural oscillations of such high frequency that they do not affect the signaling receiving instrument.

Figure 1:
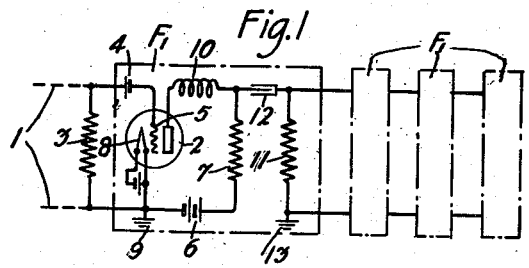
Figure 3:
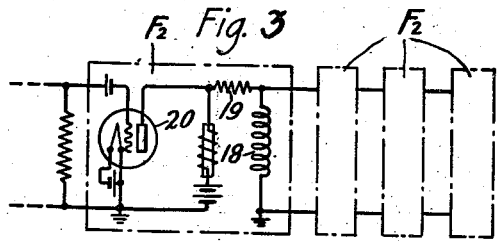
Figure 4:
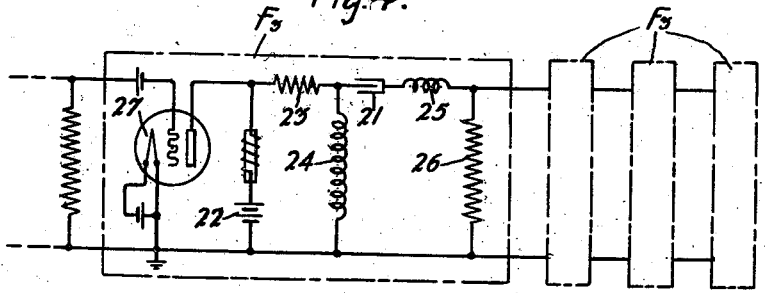

The invention is illustrated in the drawing of which Fig. 1 shows in diagrammatic form an ultra-filter; Fig. 2 is an elementary diagram of a circuit showing the principles involving this invention: Fig. 3 shows in diagrammatic form an infra filter; and Fig. 4 shows in diagrammatic form the arrangement whereby the filter is in the form of a band filter.

As shown in the drawing, an incoming line 1 is adapted to receive currents of various frequencies, the low frequency components of which are to be selectively transmitted and amplified. The block F¹ represents a filter and amplifier section, a plurality of which may be used as represented by the other blocks F¹, all of these being connected in tandem. Block F¹ comprises a vacuum tube 2 of the audion type having a high resistance 3 in shunt to its input circuit, a battery 4 which assigns a negative potential to a grid 5, and a source 6 which supplies space current for the tube through a high non-inductive resistance 7. The filament 8 of the tube is grounded as shown at 9. In shunt to the output circuit of tube 20, is a circuit which includes an inductance 10 in series with the output circuit of the tube and a resistance 11 in shunt with the output circuit of the tube. A condenser 12 is connected between inductance 10 and the resistance 11 to prevent the battery 6 from assigning a potential to the vacuum tube in the following filter section. The capacity of condenser 12 is high compared to the value of the other reactances in the system and therefore its effect on the system with regard to the proper transmission of signals is negligible. A ground 13 is provided for the resistance 11. Each section is provided with a unilateral device, such as the vacuum tube 2 above described, for the purpose of preventing reaction between the sections.

The principle of operation of the filters shown in Figs. 1 and 3 will be described in connection with Fig. 2, in which line 14 is adapted to receive currents of various frequencies, some of which are transmitted more efficiently than others. The line 14 includes a resistance 15 and an inductance 16. At low frequencies, the voltage across the inductance 16 as indicated by a voltmeter 17 is very low, while at high frequencies it will be high and the converse will be true with respect to the voltage across the resistance 15. It will be apparent then that Fig. 1 discloses an ultra-filter and Fig. 3 an infra-filter.

The showing in Fig. 3 is similar to that of Fig. 1 except that the positions of the inductance 10 and the resistance 11 in Fig. 1 are interchanged, the second filter section of the series F² being connected in shunt with the inductance 18 and the resistance 19 being in series with the output circuit of the tube 20.

With regard to Figs. 1, 3 and 4, an amplifier may be provided at the end of the series of filter sections shown in each of these figures to properly strengthen the attenuated signal currents received, although this amplifier is not shown in the drawings since it may be of any well-known form or type.

In Fig. 4, the filters shown in Figs. 1 and 3 have been combined to provide a filter for transmitting only a band of frequencies, the infra-filter serving to suppress the lower frequencies up to a certain value and the ultra-filter suppressing all frequencies beyond a given value. In this case, the condenser 21 prevents the battery 22 from assigning a potential to the next tube in the series of filter sections. From an examination of the figure, it will be clear that resistance 23 in combination with inductance 24 comprises the infra part of the band filter, whereas inductance 25 and the resistance 26 comprise the ultra part of the band filter. A plurality of similar filter sections F³ may be added to the system each comprising a band filter in conjunction with a vacuum tube device, such as the tube 27. The filters shown in Figs. 1, 2 and 4 are substantially free from capacity reactance, the effect of condensers 12 and 21 being negligible as above described. The circuits accordingly have a very high period of natural oscillations.

What is claimed is:

1. A wave filter free from capacitive reactance and comprising a plurality of filter sections, each section comprising a resistance and an inductance, and one of said sections comprising means for preventing said section from reacting on another of said sections, said means comprising an amplifier device.

2. A wave filter free from capacitive reactance and comprising a plurality of filter sections, each section comprising a resistance and an inductance, and a unidirectional current transmitting device between the sections.

3. A wave filter free from capacitive reactance and comprising recurring sections, each section comprising a series arm and a shunt arm, said arms comprising resistance and comprising solely inductive reactance.

4. A wave filter comprising a plurality of filter sections, each section comprising a reactance, said reactance being solely an inductive reactance and said sections being free from capacity, and a unidirectional current transmitting device between the sections.

5. A wave filter comprising a plurality of filter sections, each section consisting of a series arm and a shunt arm, said series arm comprising solely inductive reactance, and said shunt arm consisting of resistance.

6. A wave filter for suppressing a band of frequencies comprising in association with a circuit, a series resistance and a shunt inductance associated with a series inductance and a shunt resistance.

7. A wave filter for suppressing a band of frequencies comprising a plurality of filter sections, each section having as reactance only an inductive reactance, and an amplifier device between the sections.

8. A wave filter for suppressing a band of frequencies comprising a plurality of filter sections, each section having in association with a circuit a series resistance and a shunt inductance associated with a series inductance and a shunt resistance, and a unidirectional current transmitting device between the sections.

In witness whereof, I hereunto subscribe my name this 4th day of August, A. D. 1919.

AUSTEN M. CURTIS.